US009119071B2

(12) United States Patent
Dimou

(10) Patent No.: US 9,119,071 B2
(45) Date of Patent: Aug. 25, 2015

(54) METHODS CONTROLLING EXTENDED RANGE AREAS IN HETEROGENEOUS NETWORKS AND RELATED NETWORK NODES

(71) Applicant: Telefonaktiebolaget L M Ericsson (publ), Stockholm (SE)

(72) Inventor: Konstantinos Dimou, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 271 days.

(21) Appl. No.: 13/661,576

(22) Filed: Oct. 26, 2012

(65) Prior Publication Data

US 2014/0120928 A1   May 1, 2014

(51) Int. Cl.
*H04W 36/00*   (2009.01)
*H04W 16/08*   (2009.01)
*H04W 52/02*   (2009.01)
*H04W 84/04*   (2009.01)

(52) U.S. Cl.
CPC .......... *H04W 16/08* (2013.01); *H04W 52/0216* (2013.01); *H04W 52/0219* (2013.01); *H04W 84/045* (2013.01)

(58) Field of Classification Search
USPC ........................................................ 455/444
See application file for complete search history.

(56) References Cited

U.S. PATENT DOCUMENTS

| 6,798,765 | B2 | 9/2004 | Larsson |
| 2011/0086635 | A1 | 4/2011 | Grob-Lipski |
| 2012/0270553 | A1 | 10/2012 | Ha |
| 2013/0045749 | A1* | 2/2013 | Sridhar et al. ................ 455/443 |
| 2014/0094127 | A1 | 4/2014 | Dimou et al. |
| 2014/0120928 | A1 | 5/2014 | Dimou |

FOREIGN PATENT DOCUMENTS

| EP | 1 953 964 | 1/2007 |
| EP | 0 251 562 | 6/2007 |
| WO | WO 2010/017012 | 2/2010 |

(Continued)

OTHER PUBLICATIONS $3^{rd}$ Generation Partnership Project; "Technical Specification Group Radio Access Network"; Physical Layer; Measurements (FDD), (Release 10) pp. 1-23, 3GPP TS 25.215 V10.0.0 (Mar. 2011) France.

(Continued)

*Primary Examiner* — Huy C Ho
(74) *Attorney, Agent, or Firm* — Myer Bigel Sibley & Sajovec, P.A.

(57) ABSTRACT

A method may provide wireless communications in a network including a first base station and a second base station, with the first base station operating within a coverage area of the second base station. The method may include providing soft-cell communications in an extended range area of the first base station, with the extended range area being outside a primary range area of the first base station. A number of wireless devices in the extended range area connected and/or communicating with the first base station may be tracked. Responsive to the number of wireless devices in the extended range area connected and/or communicating with the first base station exceeding a threshold (Threshold_N), the extended range area over which soft-cell communications are provided may be reduced.

32 Claims, 8 Drawing Sheets

(56) References Cited

FOREIGN PATENT DOCUMENTS

| WO | WO 2011/119680 | 9/2011 |
|---|---|---|
| WO | WO 2012/059310 | 5/2012 |

OTHER PUBLICATIONS

3$^{rd}$ Generation Partnership Project; "Technical Specification Group Radio Access Network"; Spreading and modulation (FDD), (Release 10) pp. 1-39, 3GPP TS 25.213 V10.0.0 (Sep. 2010) France.

3$^{rd}$ Generation Partnership Project; "Technical Specification Group Radio Access Network"; Physical Layer Procedures (FDD), (Release 10) pp. 1-99, 3GPP TS 25.214 V10.0.0 (Sep. 2010) France.

A. Toskala, et al.; "High-speed Downlink Packet Access", WCDMA for UMTS, 2002, pp. 289-290, Chapter 11.5.3, John Wiley & Sons, Ltd.

Parkvall S. et al., "Heterogeneous network deployments in LTE", *Ericsson Review*, 2011, 5 Pages.

S. Landstrom, et al.; "Heterogeneous networks-increasing cellular capacity", Ericsson Review 2011, 6 pages.

U.S. Appl. No. 13/633,728, Dimou K., "Methods and Devices for Adjusting Resource Management Procedures Based on Machine Device Capability Information", Oct. 2, 2012, 74 Pages.

3GPP TSG RAN WG1 Meeting #72, R1-130323, "Technique for Efficient Small Cell Operation", St. Julian's, Malta, Jan. 28-Feb. 1, 2013, 5 pages.

3GPP RAN WS on Rel-12 and onwards, RWS-120003, "LTE Release 12 and Beyond", Ljubijana, Slovenia, Jun. 11-12, 2012, 10 pages.

International Search Report for International Application No. PCT/IB2013/059280 mailed May 28, 2014. 4 pages.

* cited by examiner

METHODS CONTROLLING EXTENDED RANGE AREAS IN HETEROGENEOUS NETWORKS AND RELATED NETWORK NODES

TECHNICAL FIELD

The present disclosure is directed to communications and, more particularly, to wireless communication methods, networks, and network nodes.

BACKGROUND

In a typical cellular radio system, wireless terminals (also referred to as user equipment unit nodes or UEs, and/or mobile terminals/stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with wireless terminals within range of the base stations.

Deployment of wireless sensors has taken place in 3GPP networks. In this type of communication (termed herein Machine To Machine or M2M communication, or Machine Type Communication or MTC), devices may consume relatively little power and may be relatively low cost. Accordingly, these devices may not have advanced processing chains in the transmitter and/or receiver. Therefore, link budgets dictating these communications may be different than normal cellular radio links between base stations and UEs. More particularly, ranges of these links are expected to be much shorter than ranges of typical UE radio links.

At least at the beginning of the deployment of wireless sensors, no additional and/or no significant additional deployment of base stations (e.g., macro or pico base stations, or relay nodes) is expected to provide additional service for these M2M/MTC wireless sensors/devices. Therefore, M2M devices located in areas with relatively poor coverage may be expected. In most cases, these devices are expected to be static. In addition, traffic is expected to be mainly on the uplink which may be a challenging radio link. To provide sufficiently error-free communication in this type of radio link, proposals have been made, for example, including longer Transmission Time Intervals (TTIs), advanced receivers at the base stations, etc.

One proposal to combat poor link budgets is significantly increased deployments of relatively small, low-power base stations (e.g., pico and/or femto base stations) and/or relay nodes in areas close to wireless sensor hotspots. Hence, it is expected that service to these devices/sensors may be provided using heterogeneous deployments including different types of network nodes, such as macro base station towers, Closed Subscriber Group (CSG) Home eNBs, pico/femto base stations, etc. It is also expected that in many of these networks, "soft-cell" features/operations may be implemented, because "soft-cell" may provide relatively smooth operation of heterogeneous networks and/or increased resource efficiency. In such systems, all cooperating base stations may be open to all of the users in the network and to a backhaul linking the cooperating base stations (typically a macro base station or tower and a number of pico/small base stations located in the macro cell area).

Notwithstanding networks/methods discussed above, there continues to exist a need in the art for improved communications for M2M/MTC devices.

SUMMARY

It is therefore an object to address at least some of the above mentioned disadvantages and/or to improve performance of access control in a communication system.

According to some embodiments disclosed herein, a method may provide wireless communications in a network including a first base station and a second base station, with the first base station operating within a coverage area of the second base station. The method may include providing soft-cell communications in an extended range area of the first base station, with the extended range area being outside a primary range area of the first base station. A number of wireless devices in the extended range area connected and/or communicating with the first base station may be tracked. Responsive to the number of wireless devices in the extended range area connected and/or communicating with the first base station exceeding a threshold (Threshold_N), the extended range area over which soft-cell communications are provided may be reduced.

Tracking the number of wireless devices may include tracking a number of wireless devices that are static, that communicate primarily on an uplink, and that are power limited.

Tracking the number of wireless devices may include for each wireless device that requests connection to the first base station, determining whether the wireless device is static, communicates primarily on an uplink, and is power limited, and responsive to determining that the wireless device is static, communicates primarily on the uplink, and is power limited, incrementing a counter value.

Reducing the extended range area may include reducing the extended range area responsive to the counter value exceeding the threshold (Threshold_N).

Reducing the extended range area may include terminating soft cell communications for the first base station.

Providing soft-cell communications in the extended range area may include transmitting a same reference signal sequence from the first base station and from the second base station, and terminating soft cell communications for the first base station may include transmitting different reference signal sequences from the first base station and the second base station.

Providing soft-cell communications in the extended range area may include receiving uplink communications from a wireless terminal in the extended range area at the first base station while transmitting downlink communications to the wireless terminal in the extended range area from the second base station, and reducing the extended range area may include receiving all uplink communications from the wireless terminal in the extended range area at the first base station while transmitting all downlink communications to the wireless terminal in the extended range area from the first base station.

Providing soft-cell communications in the extended range area may include transmitting a same reference signal sequence from the first base station and from the second base station, and reducing the extended range area may include increasing a transmission power of the reference signal sequence from the first base station and/or reducing a transmission power of the reference signal sequence from the second base station.

Reducing the extended range area may include changing a reference signal sequence of the first base station and/or increasing a transmission power of a reference signal sequence transmitted by the first base station.

Reducing the extended range area may include transmitting a request from the first base station to the second base station to change a reference signal sequence of the second base station and/or to reduce a transmission power of a reference signal sequence transmitted by the second base station.

Tracking may include tracking a number of wireless devices in the extended range area connected with the first base station, and reducing may include reducing the extended range area over which soft-cell communications are provided responsive to the number of wireless devices in the extended range area connected with the first base station exceeding a threshold (Threshold_N).

Tracking may include tracking a number of wireless devices in the extended range area communicating with the first base station, and reducing may include reducing the extended range area over which soft-cell communications are provided responsive to the number of wireless devices in the extended range area communicating with the first base station exceeding a threshold (Threshold_N).

According to some other embodiments, a first base station may provide communications within a coverage area of a second base station, and the first base station may include a transceiver configured to provide communications with wireless terminals over a wireless interface, and a processor coupled to the transceiver. The processor may be configured to provide soft-cell communications through the transceiver in an extended range area of the first base station, with the extended range area being outside a primary range area of the first base station. The processor may be configured to track a number of wireless devices in the extended range area connected and/or communicating with the first base station, and to reduce the extended range area over which soft-cell communications are provided responsive to the number of wireless devices in the extended range area connected and/or communicating with the first base station exceeding a threshold (Threshold_N).

The processor may be configured to track the number of wireless devices by tracking a number of wireless devices that are static, that communicate primarily on an uplink, and that are power limited.

The processor may be configured to track the number of wireless devices by determining for each wireless device that requests connection to the first base station, whether the wireless device is static, communicates primarily on an uplink, and is power limited, and by incrementing a counter value responsive to determining that the wireless device is static, communicates primarily on the uplink, and is power limited.

The processor may be configured to reduce the extended range area by reducing the extended range area responsive to the counter value exceeding the threshold (Threshold_N).

The processor may be configured to reduce the extended range area by terminating soft cell communications for the first base station.

The processor may be configured to provide soft-cell communications in the extended range area by transmitting a same reference signal sequence from the first base station and from the second base station, and the processor may be configured to terminate soft cell communications for the first base station by transmitting different reference signal sequences from the first base station and the second base station.

The processor may be configured to provide soft-cell communications in the extended range area by receiving uplink communications from a wireless terminal in the extended range area at the first base station while transmitting downlink communications to the wireless terminal in the extended range area from the second base station, and the processor may be configured to reduce the extended range area by receiving all uplink communications from the wireless terminal in the extended range area at the first base station while transmitting all downlink communications to the wireless terminal in the extended range area from the first base station.

The processor may be configured to provide soft-cell communications in the extended range area by transmitting a same reference signal sequence from the first base station and from the second base station, and the processor may be configured to reduce the extended range area by increasing a transmission power of the reference signal sequence from the first base station and/or by reducing a transmission power of the reference signal sequence from the second base station.

The processor may be configured to reduce the extended range area by changing a reference signal sequence of the first base station and/or by increasing a transmission power of a reference signal sequence transmitted by the first base station.

The processor may be configured to reduce the extended range area by transmitting a request from the first base station to the second base station to change a reference signal sequence of the second base station and/or to reduce a transmission power of a reference signal sequence transmitted by the second base station.

The processor may be configured to track by tracking the number of wireless devices in the extended range area connected with the first base station, and the processor may be configured to reduce by reducing the extended range area over which soft-cell communications are provided responsive to the number of wireless devices in the extended range area connected with the first base station exceeding a threshold (Threshold_N).

The processor may be configured to track by tracking a number of wireless devices in the extended range area communicating with the first base station, and the processor may be configured to reduce by reducing the extended range area over which soft-cell communications are provided responsive to the number of wireless devices in the extended range area communicating with the first base station exceeding a threshold (Threshold_N).

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings.

DETAILED DESCRIPTION

Figure 1:
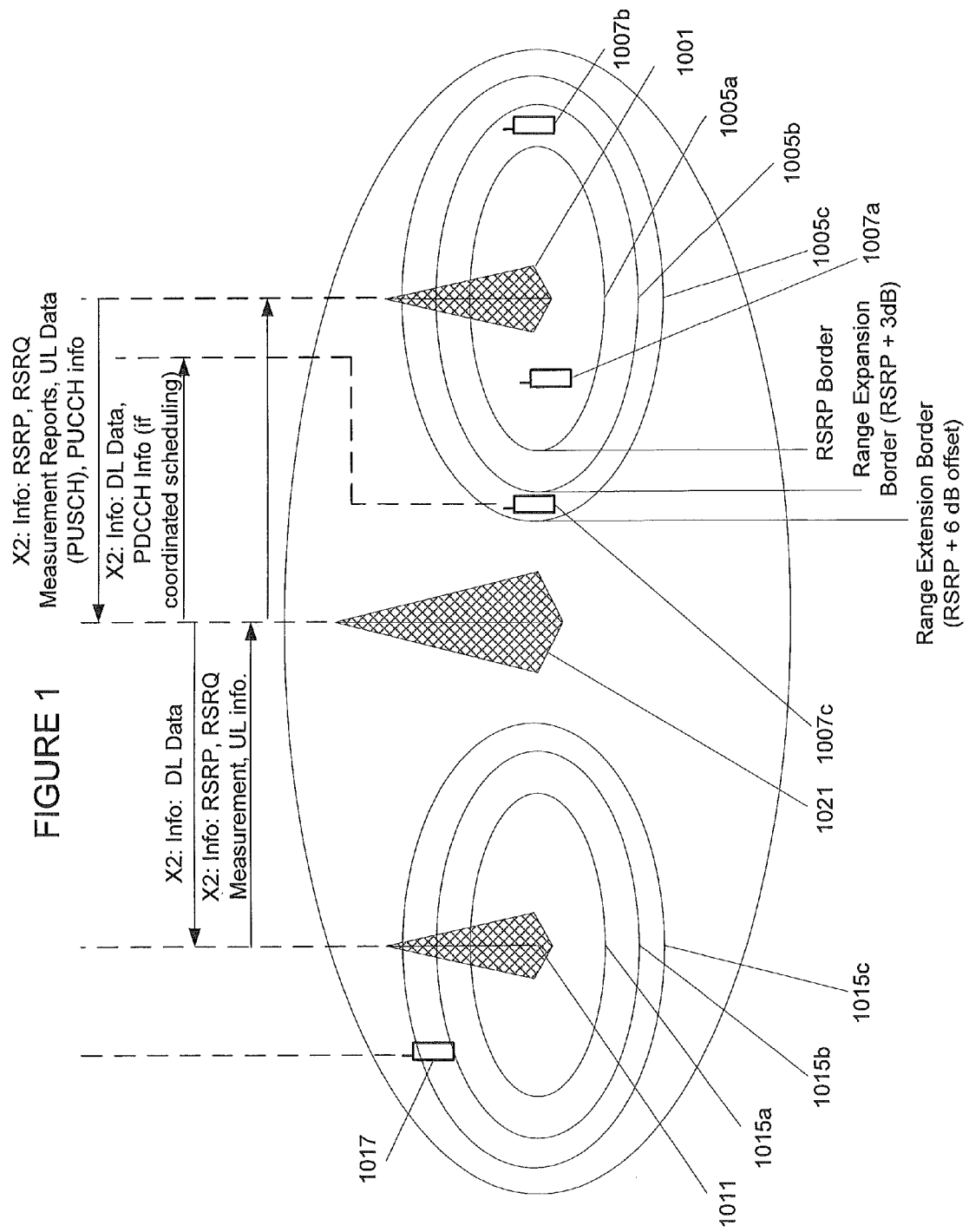
FIG. 1 is a schematic diagram illustrating elements of a heterogeneous network.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a Radio Access Network (RAN) that communicates over radio communication channels with wireless terminals (also referred to as UEs). It will be understood, however, that present inventive concepts are not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the inventive concepts, this should not be seen as limiting the scope of inventive concepts to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in an uplink to an eNodeB to a UE, embodiments of inventive concepts may also be applied, for example, in a downlink. Furthermore, although the description below focuses, for purposes of illustration, on example embodiments in which described solutions are applied in heterogeneous networks that include a mix of relatively higher-power (e.g., "macro") base stations and relatively lower-power (e.g., "pico") base stations, the described techniques may be applied in any suitable type of network, including both homogeneous and heterogeneous configurations. Thus, the base stations involved in the described soft-cell configurations may be identical to one another, or may differ in terms of transmission power, number of transmitter-receiver antennas, processing power, receiver and transmitter characteristics, and/or any other functional or physical capability.

As used herein, "soft-cell" may refer to any communication techniques that can be used by a particular node or cell of a radio access network in which other nodes and/or cells may be responsible for providing some aspect of service for devices that are served by the relevant soft-cell node or cell. In particular embodiments, soft-cell service may result in asymmetry in which a first group of one or more nodes/cells are responsible for providing one aspect of service to a served device, while a second group of one or more nodes/cells are responsible for providing another aspect of service to the served device. In various embodiments, soft-cell service may result in, for example, different nodes/cells providing uplink service from those providing downlink service; different nodes/cells serving control channels from those serving data channels; or different nodes/cells serving some control channels from those serving other control channels. More generally, soft-cell service may result in a device receiving any particular aspect of its service from one node/cell (or group of nodes/cells) that differs from the node/cell (or group of nodes/cells) that provide some other aspect of its service. Depending on the configuration and capabilities of a particular network, soft-cell service may be provided to all of the devices served by a particular node/cell or only to a subset of those served by the relevant node/cell (e.g., devices located in a particular portion of a node's service area, devices whose radio channel(s) satisfy certain criteria).

For example, within heterogeneous networks featuring soft-cell, some users located in areas close to a smaller pico base station may be served by a macro base station for downlink control signaling (e.g., broadcast channel BCH and/or Cell Specific Reference Symbol CRS signaling/sequence) and from a pico base station for data traffic. Soft cell operations may continue to evolve, and further variations may be expected. One variation might be that the macro base station (also referred to as a macro transmission point) transmits BCH, CRS, and downlink control via a Physical Dedicated Control Channel (PDCCH) to the user equipment (UE) and that the small base station transmits a Physical Dedicated Shared Channel (PDSCH) when a backhaul is fast enough to allow this operation. According to another variation, downlink control and data may be transmitted from the macro base station transmission point, and control and data may be received over an uplink at a closest open access pico base station transmission/reception point when a backhaul connecting the cooperating base stations allows this operation.

FIG. 1 illustrates different variations of soft cell operations within a heterogeneous network deployment. A first variation is illustrated on right side portions of FIG. 1. The pico/small cell is controlled by an open access Low Power Node (LPN), also referred to as pico/small base station 1001. The small cell serviced by pico base station 1001 may include/define three zones.

First zone 1005a defines a primary range (closest to pico/small base station 1001) of the small cell. Users or User Equipment nodes (also referred to as wireless terminals, UEs, user equipment, etc.) which are located in the first zone (closest to the small base station) may be entirely served by the pico/small base station 1001 transmission/reception point as shown by wireless terminal 1007a. Stated in other words, all uplink and downlink communications (including control and data communications) for wireless terminals in first zone 1005a (including wireless terminal 1007a) may be provided through pico/small base station 1001.

Second zone 1005b defines a first extended range of the small cell outside first zone 1005a. For UEs located in the first extended range of the small cell (such as wireless terminal 1007b), the BCH and CRS may be transmitted via the macro transmission point of macro base station 1021, and all other communications (e.g., Physical Downlink Control Channel or PDCCH, Physical Downlink Shared Channel or PDSCH, and all uplink data/control channels including Physical Uplink Shared Channel or PUSCH and Physical Uplink Control Channel or PUCCH) may be transmitted/received by the pico base station 1001 transmitter/receiver point. The measurements done on Reference Symbols RS (e.g., RS Received Power or RSRP, and/or RS Received Quality or RSRQ) may either be maintained at the pico base station 1001 or forwarded to the neighbor macro base station 1021. In the event that handover decisions are made at the serving pico/small base station 1001, then, RS measurements may not need to be forwarded to the neighbor macro base station 1021. In a situation where handover decisions for UEs located in the first extended range of the pico/small cell are made at the central macro base station (eNB) 1021, then, RSRP and RSRQ measurements may be forwarded from the pico base station 1001 to the macro base station 1021.

In the event that downlink data is transmitted via the macro base station, data scheduling may be performed by the macro base station for the pico base station and forwarded to the pico base station. In this situation, a backhaul connecting the cooperating base stations (e.g., an X2 interface) may need to provide relatively low latency. In this situation, any other information related to the downlink radio link (e.g., CQI, CSI, etc.) may be forwarded from pico/small base station 1001 to the macro base station 1021, and this information may be transmitted to wireless terminal 1005b using the radio interface via PUCCH (Physical Uplink Control CHannel).

Third zone 1005c of the pico/small cell at the right of FIG. 1 defines a second extended range (farthest from pico/small base station 1001) outside of first and second zones 1005a and 1005b. UEs in the third zone (e.g., wireless terminal 1007c) may receive all downlink communications (e.g., CRS, BCH, PDCCH, PDSCH, PHICH or Physical Hybrid-ARQ Indicator CHannel, etc.) from macro base station 1021 and may transmit all uplink communications (e.g., RACH or Random Access CHannel, PUCCH, PUSCH, etc.) to pico/small base station 1001. To allow this operation, an X2 interface (or any other type of interface linking cooperating macro and pico/small base stations 1001 and 1021) may have to provide relatively low latency, because feedback for the downlink radio link should be given via pico/small base station 1001 to the macro base station 1021.

On left side portions of FIG. 1, a second pico/small cell supported by pico/small base station 1011 is illustrated. The pico/small cell (supported by pico/small base station 1011) on left side portions of FIG. 1 may define three zones 1015a, 1015b, and 1015c. While soft-cell operations used in second (middle) zone 1015b of pico/small base station 1011 may be the same as and/or similar to soft-cell operations used in second (middle) zone 1005b of pico/small base station 1001, soft cell operations of third (external) zone 1015c of the pico/small base station 1011 may be different. More particularly, macro base station 1021 transmission point may transmit only CRS, BCH, PDCCH, and PHICH to UEs located in third zone 1015c. Downlink data transmission (via PDSCH) as well as all of the uplink channels (e.g., including PUCCH and PUSCH) for UEs (e.g., wireless terminal 1017) located in third zone 1015c may be communicated with the pico/small base station 1011 transmission/reception point. This variation of soft-cell operations used by pico/small base station 1011 may be more suitable for small cells where UEs do not receive significantly strong downlink interference from the neighbor macro base station 1021. This variation used by pico/small base station 1011 may also be suitable for schemes where Almost Blank Subframes (ABSF) and/or PDCCH transmissions from the macro base station 1021 are protected.

Other variations of soft-cell operations may be possible for various latency capabilities supported from different backhauls and/or for different types of zones. Another dimension which can be given in soft-cell variants is related to a number of carriers involved in soft-cell operations. Different carrier aggregation or single carrier scenarios may be used. The discussion of FIG. 1 relates to a single carrier. In a single-carrier soft-cell implementation, UEs may receive CRS sequences from both the closest macro and from pico base stations. For example, exactly the same CRS sequence may be transmitted to a wireless terminal by both macro base station 1021 and pico/small base station 1001/1011. A UE (e.g., wireless terminal 1007c/1017) may then estimate the channel using combined signal strengths from macro base station 1021 and pico base station 1001/1011. The present disclosure may be extended to base stations using more than one carrier.

In M2M/MTC communications, most of the wireless sensors/devices are expected to be static and to transmit a very well defined type of information at a very well defined pattern (e.g., an electricity measurement transmitted from a utility meter every K seconds). These devices are expected to be in sleep mode most of the time and are expected to wake up only to transmit one or few packets before returning to sleep mode. In addition, these devices are expected to be relatively inexpensive and to consume relatively little energy. Accordingly, a relatively long discontinuous reception DRX cycle has been proposed for these devices/sensors.

For a wireless sensor/device located in an extended zone of a pico/small cell operating under these conditions, use of soft cell concepts may result in a relatively inefficient use of energy from the wireless device/sensor because the use of soft cell concepts may result in the wireless sensor/device transmitting with higher power than may be needed. If soft cell concepts of FIG. 1 are used with a wireless device/sensor that does not support more than one carrier, for example, then the wireless sensor/device may be assumed to operate at a main (anchor) carrier frequency of the radio access network (RAN) operator.

If a given wireless device/sensor is located at an extended range of a small cell controlled by a pico/small station 1001/1011 and the RAN operator makes use of soft-cell operations/features, then single carrier soft cell operations/features may be used. In such a case, a wireless sensor/device located in an extended range of a pico/small cell may receive CRS sequences from both macro base station 1021 and pico base station 1001/1011. Wireless sensors/terminals may transmit random access preambles based on channel estimation done in downlink with the help of a CRS sequence. In such a case, a wireless sensor/device may transmit at a given power level in uplink which may be much higher than needed, since the uplink signal is received by pico/small base station 1001/1011 in uplink and the channel estimation is done in downlink via CRS sequences from both macro base station 1021 and pico base station 1001/1011. This discrepancy between uplink and downlink channel estimation may also result in unnecessarily high transmission power from a wireless sensor/device when a wireless sensor/device wakes up after a long DRX sleep mode and initiates transmitting for the first time once awake, as may occur frequently in M2M/MTC communications. Moreover, low energy consumption may be especially desirable for M2M/MTC devices.

According to some embodiments, mechanisms may be provided at the network so that soft-cell operations/features are not applied to devices/sensors (e.g., M2M/MTC devices/sensors) for which soft-cell operations/features might otherwise apply. These mechanisms may be achieved, for example, by boosting transmission power for a CRS sequence(s) of a pico/small base station 1001/1011 and/or reducing transmission power of a macro base station 1021 CRS sequence(s).

According to some embodiments within a network providing soft-cell cooperation between macro base stations and adjacent pico/small base stations, a pico/small base station may request that a closest/cooperating macro base station (having an overlapping coverage area) transmit a separate CRS sequence(s) responsive to determining that a number N of M2M/MTC wireless sensors/devices located in an extended range of the pico/small base station exceeds a threshold. Stated in other words, once a number N of M2M/MTC wireless sensors/devices in an extended range of a pico/small base station exceeds a threshold, the pico/small base station may request that different/separate CRS sequences be transmitted by the pico/small base station and the adjacent macro base station.

Figure 2A:
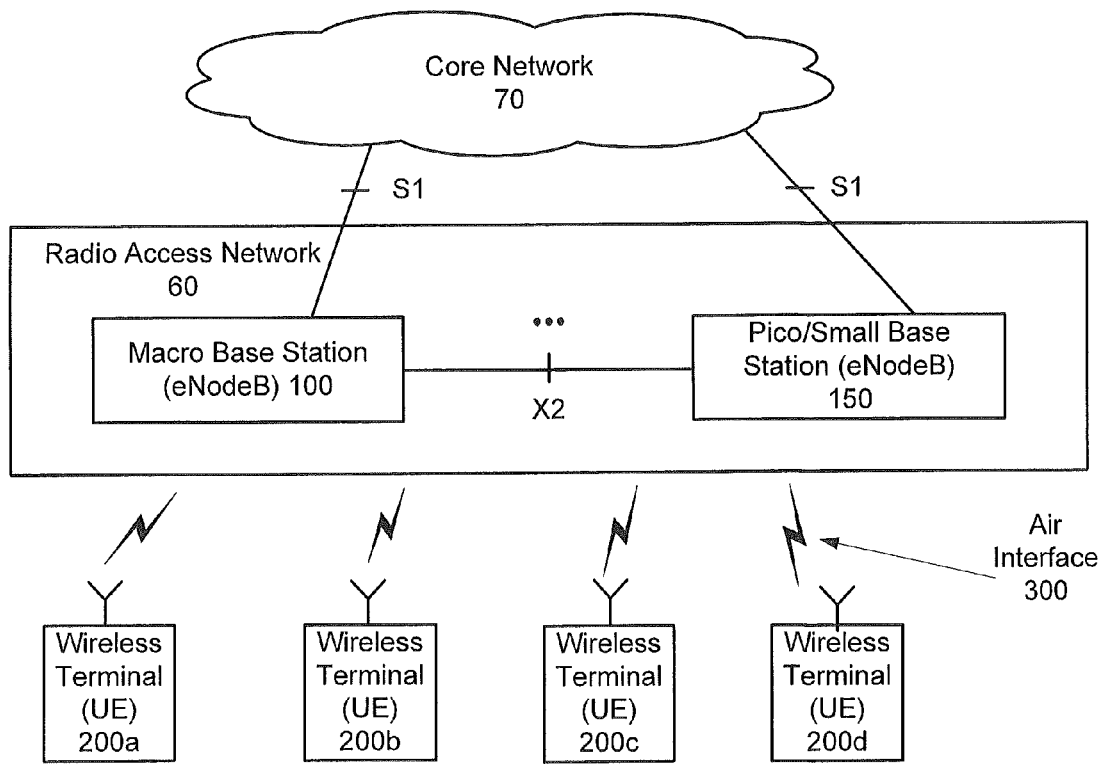
FIG. 2A is a block diagram of wireless network elements configured according to some embodiments.
Figure 3:
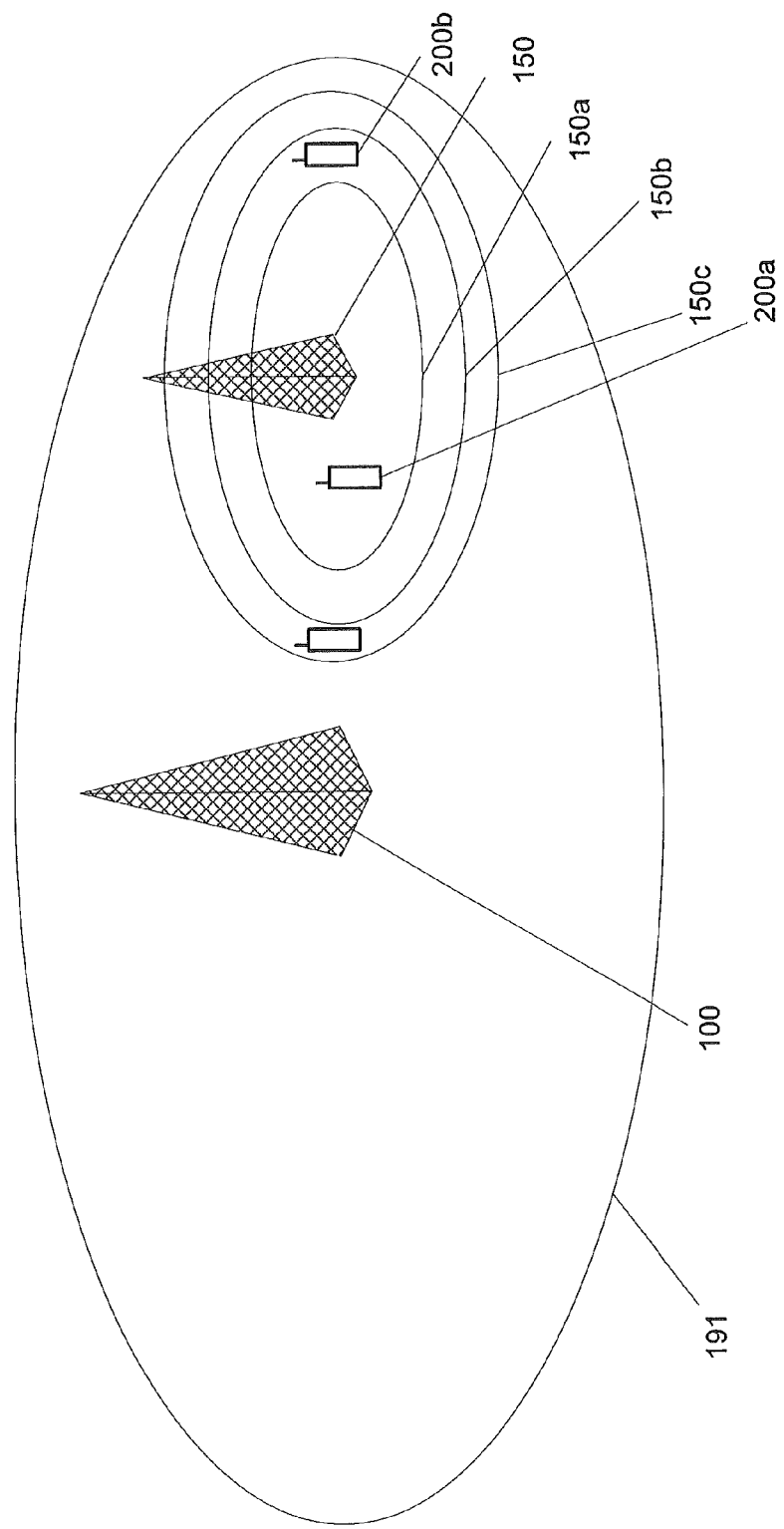
FIG. 3 is a schematic diagram illustrating elements of FIG. 2A.

FIG. 2A is a schematic diagram of a communication system that is configured to operate according to some embodiments of the present inventive concepts, and FIG. 3 is a schematic diagram illustrating elements of FIG. 2A. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate over an air interface 300 (also referred to as a wireless channel or channels) with wireless terminals (also referred to as user equipment nodes or UEs) 200 that are within their respective communication service cells (also referred to as coverage areas). The radio base stations 100 can communicate with one another through an X2 interface(s) and with the core network(s) 70 through S1 interfaces, as is well known to one who is skilled in the art.

RAN 60 may be a heterogeneous network, and base stations 100 may thus be referred to as macro base stations 100. A macro base station 100 may thus transmit/receive communications over a relatively large cell/geographic coverage area 191, while a pico/small base station 150 may transmit/receive communications over a relatively small cell/geographic area including primary range area 150a and/or extended range areas 150b/150c located within coverage area 191. Soft cell features/operations may be provided for extended range areas 150b and/or 150c as discussed above with respect to FIG. 1, for example. Soft-cell features/operations are also discussed, for example, by Stefan Parkvall, et al., in "Heterogeneous Network Deployments In LTE," Ericsson Review, February 2011, the disclosure of which is hereby incorporated herein in its entirety by reference.

Figure 2B:
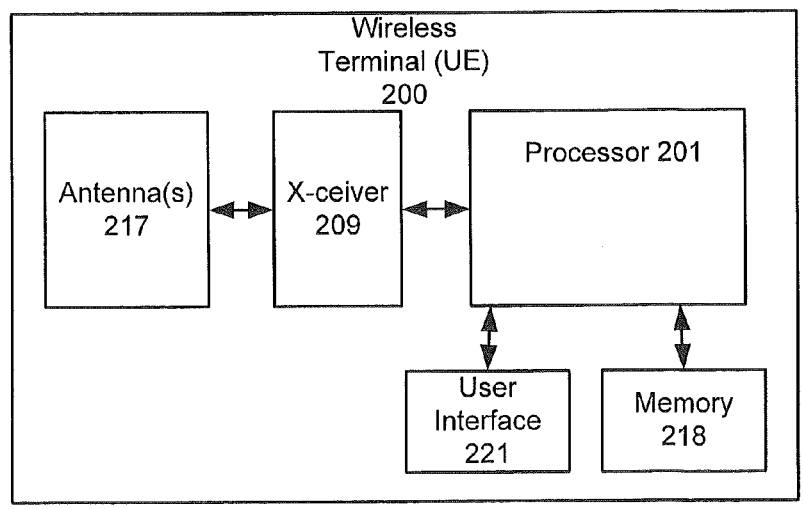
FIG. 2B is a block diagram of a wireless terminal of FIG. 2A.
Figure 2C:
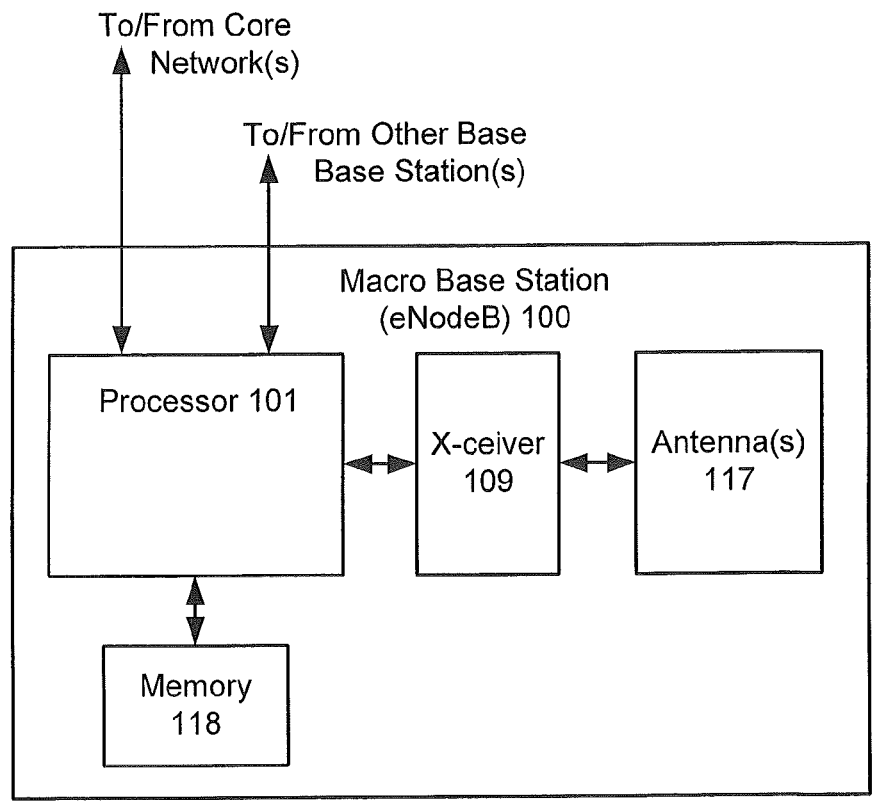
FIG. 2C is a block diagram of a macro base station of FIG. 2A.

FIG. 2B is a block diagram of a wireless terminal 200 of FIG. 2A, and FIG. 2C is a block diagram of a macro base station 100 of FIG. 2A. As shown, macro base station 100 may include transceiver 109 coupled between processor 101 and antenna(s) 117 (e.g., an antenna array including multiple antennas), and memory 118 coupled to processor 101. Moreover, wireless terminal 200 may include transceiver 209 coupled between antenna(s) 217 (e.g., an antenna array including multiple antennas) and processor 201, and user interface 221 (e.g., including one or more of a display, a touch sensitive screen, a keypad, a microphone, a speaker, etc.) and memory 218 may be coupled to processor 201. Elements of FIG. 2B are shown by way of example, and illustrated elements may be omitted and/or other elements may be included. In an M2M or MTC type device, for example, a user interface of wireless terminal 200 may be omitted. Accordingly, base station 100 may transmit communications from processor 101 through transceiver 109 and antenna array 117 for reception at wireless terminal 200 through antenna(s) 217, transceiver 209, and processor 201, and wireless terminal 200 may transmit communications from processor 201 though transceiver 209 and antenna(s) 217 for reception at base station 100 through antenna(s) 117, transceiver 109, and processor 101.

Figure 2D:
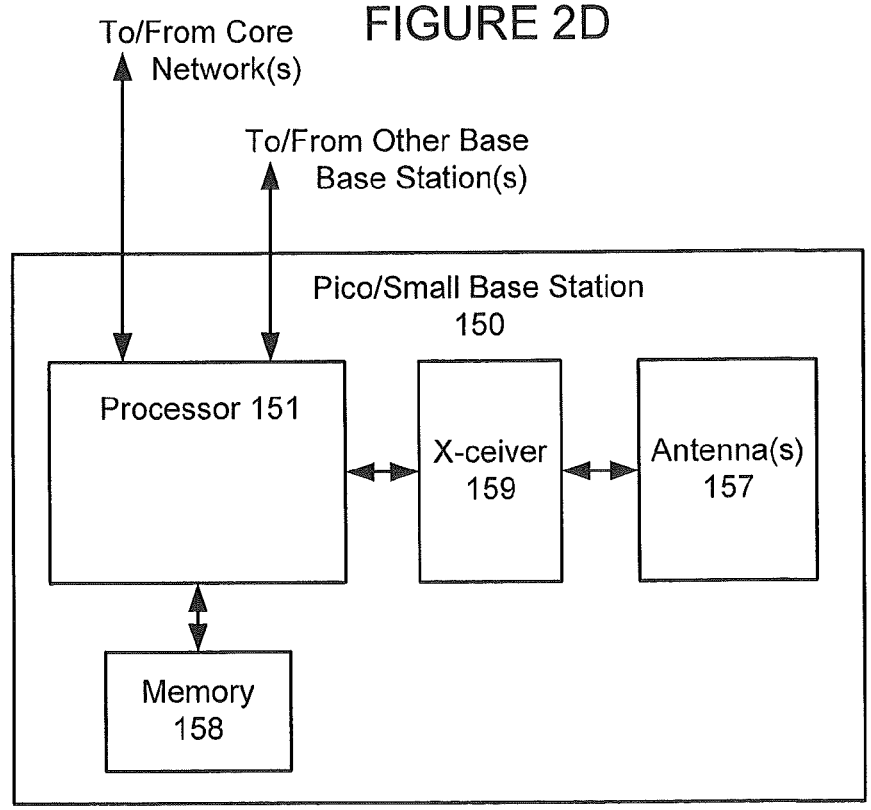
FIG. 2D is a block diagram of a pico/small base station of FIG. 2A.

FIG. 2D is a block diagram of a pico/small base station 150 of FIG. 2A. As shown, pico/small base station 150 may include transceiver 159 coupled between processor 151 and antenna(s) 157 (e.g., an antenna array including multiple antennas), and memory 158 coupled to processor 151. Accordingly, pico/small base station 150 may transmit communications from processor 151 through transceiver 159 and antenna array 157 for reception at wireless terminal 200 through antenna(s) 217, transceiver 209, and processor 201, and wireless terminal 200 may transmit communications from processor 201 though transceiver 209 and antenna(s) 217 for reception at pico/small base station 150 through antenna(s) 157, transceiver 159, and processor 151.

Figure 4:
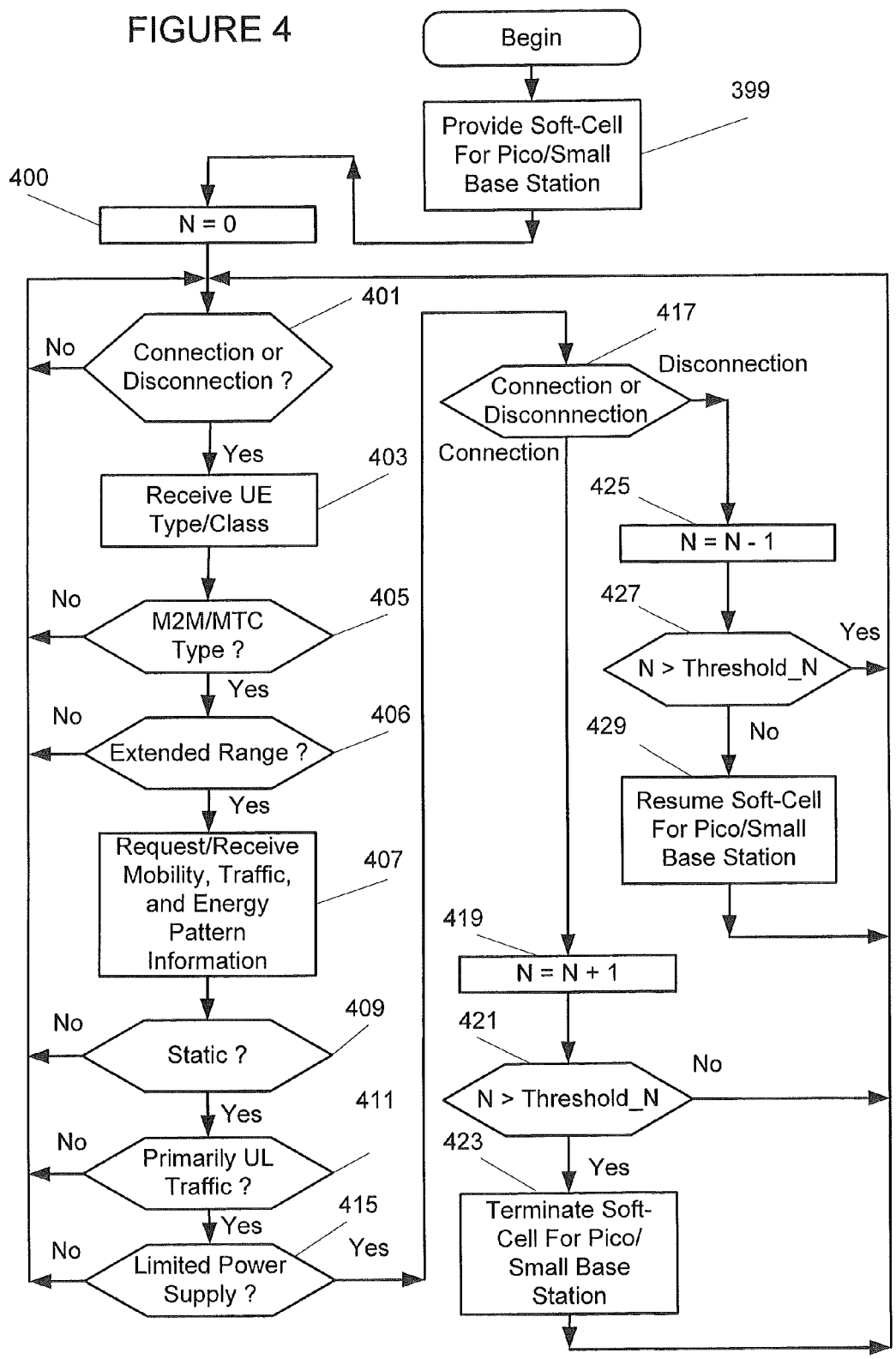
FIG. 4 is a flow chart illustrating operations of a pico/small base station processor according to some embodiments.

FIG. 4 is a flow chart illustrating pico/small base station 150 operations according to first embodiments disclosed herein. Serving pico/small base station 150 may receive a UE type (also referred to as a UE class) for each wireless terminal 200 (e.g., UE) communicating in its cell coverage area. More particularly, each wireless terminal 200 may report its UE type/class to its serving base station any time that it tries to establish an RRC (Radio Resource Control) connection, and pico/small base station 150 may thus receive a UE type/class for a wireless terminal each time a wireless terminal initiates an RRC connection.

Operations of FIG. 4 may begin by providing soft-cell features/operations for terminals in an extended range area 150b/150c at block 399, and initializing a counter value N to zero at block 400. The counter value N may represent a number of static, power limited M2M/MTC devices/sensors operating in an extended range zone of pico/small base station that primarily communicate over the uplink. At block 401, processor 151 of pico base station 150 may wait for an RRC connection attempt by a wireless terminal 200 or for a disconnection by a connected wireless terminal. When receiving an RRC connection attempt or a disconnection from a wireless terminal at block 401, processor 151 may receive a UE type/class from the wireless terminal attempting the connection/disconnection at block 403. In the example of FIGS. 2A and 3, for example, each of wireless terminals 200a, 200b, and 200c may transmit a respective UE type/class to pico/small base station 150 when establishing a respective RRC connection. Accordingly, the network (including macro base station 100 and/or pico/small base station 150) may be aware of the UE type/class of each wireless terminal communicating in a cell (including zones 150a, 150b, and 150c) serviced by pico/small base station 150.

One or more UE types/classes may be assigned to identify M2M/MTC devices/sensors. Proposals for such UE types/classes have been discussed within 3GPP and are likely to be accepted in 3GPP releases. Accordingly, the serving pico/small base station 150 may be aware of the existence of wireless terminals having M2M/MTC sensor/device types/classes that are operating in the cell serviced by pico/small base station 150.

At block 405 of FIG. 4, the network (e.g., processor 151 of pico/small base station 150) may determine whether the wireless terminal attempting RRC connection reports a "machine" type/class (e.g., sensor, device, M2M/MTC sensor/device type/class). At block 406, the network (e.g., processor 151) may determine whether the wireless terminal attempting the RRC connection is in an extended range zone (e.g., zone 150b and/or 150c) of pico/small base station 150. If the wireless terminal reports a "machine" type/class at block 405 and the wireless terminal is in an extended range zone of pico/small base station 150 at block 406, the network (e.g., processor 151 of pico/small base station 150) may request mobility information, traffic information, and/or energy pattern information from the wireless terminal (attempting the RRC connection from block 401) at block 407. The mobility information may indicate whether the wireless terminal is static (e.g., substantially immobile, stationary, etc.) or mobile. The traffic information may indicate whether the wireless terminal communicates according to a traffic pattern wherein the wireless terminal transmits primarily in uplink and with a well defined traffic pattern (e.g., a given packet size with defined inter-arrival times). For example, a well specified traffic pattern may provide periodic transmissions of data packets having a same size. The energy pattern information may indicate whether the wireless terminal has a limited power supply. For example, a wireless terminal operating on battery power may be considered as having a limited power supply, while a wireless terminal operating from a wired power connection (e.g., a direct or indirect connection to a 120 volt and/or a 220 volt outlet) may be considered as having an unlimited power supply.

If the wireless sensor/device is static at block 409, if the traffic pattern indicates that communication activity will be primarily in the uplink at block 411 with a well defined traffic pattern, and if no access to unlimited energy is available at block 415, then the network (e.g., pico/small base station processor 151) may identify the wireless terminal as an M2M/MTC sensor/device that is subject to issues discussed above relating to static wireless devices/sensors with relatively strict requirements for low energy consumption. The network request of block 407 for mobility, traffic, and energy pattern information and/or the wireless terminal response may be provided as discussed in U.S. application Ser. No. 13/633,728, filed Oct. 2, 2012, the disclosure of which is hereby incorporated herein in its entirety by reference.

If the M2M/MTC type device is static (lacking mobility), primarily communicating uplink traffic according to a well defined pattern, and subject to a limited power supply (power limited), and if the M2M/MTC device is attempting an RRC connection at block 417 from an extended range zone, pico/small base station processor 151 may increment the counter N indicating an increase in a number of M2M/MTC devices/sensors having these characteristics (static, primarily communicating in the uplink, and power limited) in communication with the pico/small base station in an extended range zone at block 419. At block 421, the network (e.g., pico/small base station processor 151) may then check to see if the counter value N exceeds a predefined threshold number, Threshold_N. Stated in other words, the pico/small base station processor may check to see if a number of M2M/MTC devices/sensors in an extended range zone that are static, primarily communicating uplink traffic, and power limited exceeds the Threshold_N. If the total number N of such M2M/MTC devices/sensors exceeds the threshold at block 419, the network (e.g., pico/small base station processor 151) may request that cooperating macro base station 100 stop/terminate soft-cell operations with pico/small base station 150 at block 423. Stated in other words, once the number of such M2M/MTC devices/sensors communicating with pico/small base station in the extended range zone exceeds the threshold Threshold_N at block 421, all up/down link communications for M2M/MTC devices communicating with pico/small base station 150 may be received/transmitted through pico/small base station 150.

As shown in FIG. 4, as long as counter value N is not greater than Threshold_N, pico/small base station 150 may support soft-cell operations for wireless terminals in extended zones 150b and/or 150c wherein up/down link communications are shared by macro base station 100 and pico/small base station 150. During soft-cell operations, both macro base station 100 and pico/small base station 150 may use a same CRS sequence. Once counter value N exceeds Threshold_N at block 421, soft-cell operations may be terminated. When soft-cell operations are terminated, macro base station 100 and pico/small base station 150 may use different CRS sequences.

As shown at blocks 417, 425, 427, and 429, counter value N may also be decremented when an M2M/MTC devices/sensors in an extended range zone that is static, primarily communicating uplink traffic, and power limited disconnects from communication with pico/small base station. Stated in other words, once pico/small base station processor 151 increments counter value N responsive to an M2M/MTC device/sensor connecting at blocks 417 and 419, pico/small base station may later decrement counter value N responsive to the M2M/MTC device/sensor disconnecting at blocks 417 and 425. Accordingly, if the counter value exceeds the threshold Threshold_N after incrementing the counter value at blocks 419 and 421, pico/small base station processor 151 may stop soft-cell operations at block 423. Conversely, if the counter value does not exceed the threshold Threshold_N after decrementing the counter value at blocks 425 and 427, pico/small base station processor 151 may resume soft-cell operation at block 429. Accordingly, pico/small base station may resume soft-cell operations at block 429 if the number of M2M/MTC devices/sensors in the extended range zone that are static, primarily communicating uplink traffic, and power limited drops below the threshold Threshold_N at block 427. Pico/small base station may thus adapt to changing numbers of static, primarily uplink, and power limited M2M/MTC devices/sensors communicating therewith in the extended range zone.

Providing/resuming soft-cell communications in the extended range area 150b/150c (e.g., at block 399 and/or 429), for example, may include transmitting a same reference signal sequence (e.g., a CRS sequence) from pico base station 150 and from macro base station 100. Terminating soft cell communications (e.g., at block 423) for pico base station 150 may include transmitting different reference signal sequences (e.g., different CRS sequences) from pico base station 150 and macro base station 100.

Providing/resuming soft-cell communications in the extended range area 150b/150c (e.g., at block 399 and/or 429) may include receiving uplink communications from wireless terminal 200 in the extended range area 150b/150c at pico base station 150 while transmitting downlink communications to wireless terminal 200 in extended range area 150b/150c from macro base station 100. Terminating the extended range area may include receiving all uplink communications from wireless terminal 200 in the extended range area 150b/150c at the pico base station 150 while transmitting all downlink communications to the wireless terminal 200 in the extended range area 150b/150c from the pico base station 150.

Figure 5:
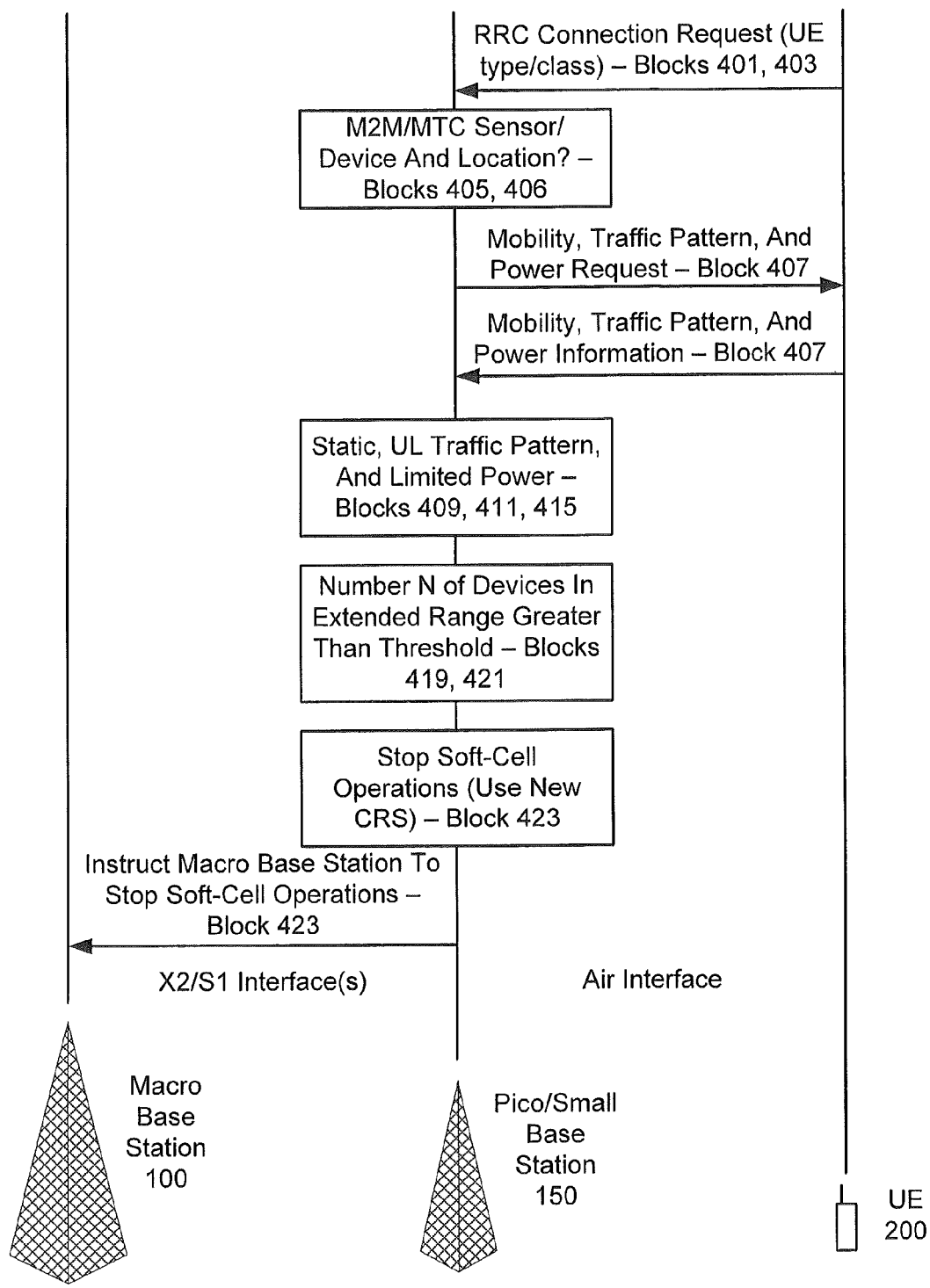
FIGS. 5 and 6 are messaging diagrams illustrating signaling between elements of FIG. 2A.

FIG. 5 is a diagram illustrating signaling according to some embodiments illustrated in FIG. 4. Operations of blocks 401, 403, 405, 406, 407, 409, 411, 415, 417, 419, and 421 may be performed as discussed above with respect to FIG. 4, for example, with signaling between macro base station 100, pico/small base station 150, and UE 150 as shown in FIG. 5. At block 423 of FIGS. 4 and 5, pico/small base station processor 151 may stop/terminate soft-cell operations by switching to use a new CRS sequence (different than the CRS sequence or sequences used by macro base station 100) and instructing the macro base station 100 to stop/terminate soft cell operations. Accordingly, the pico/small base station processor 151 may make the decision to stop/terminate soft-cell operations responsive to the counter value N exceeding the threshold Threshold_N, the pico/small base station processor 151 may initiate use of new transmission CRS sequence that is different than a CRS sequence or sequences transmitted by the neighbor macro base station 100, and pico/small base station processor 151 may notify macro base station 100 of this decision.

Messages exchanged over the air in FIG. 5 may be RRC messages, as also described, for example, in U.S. application Ser. No. 13/633,728, filed Oct. 2, 2012. The interface for communication between macro base station 100 and pico/small base station 150 may be an X2 and/or an S1 interface(s).

Figure 6:
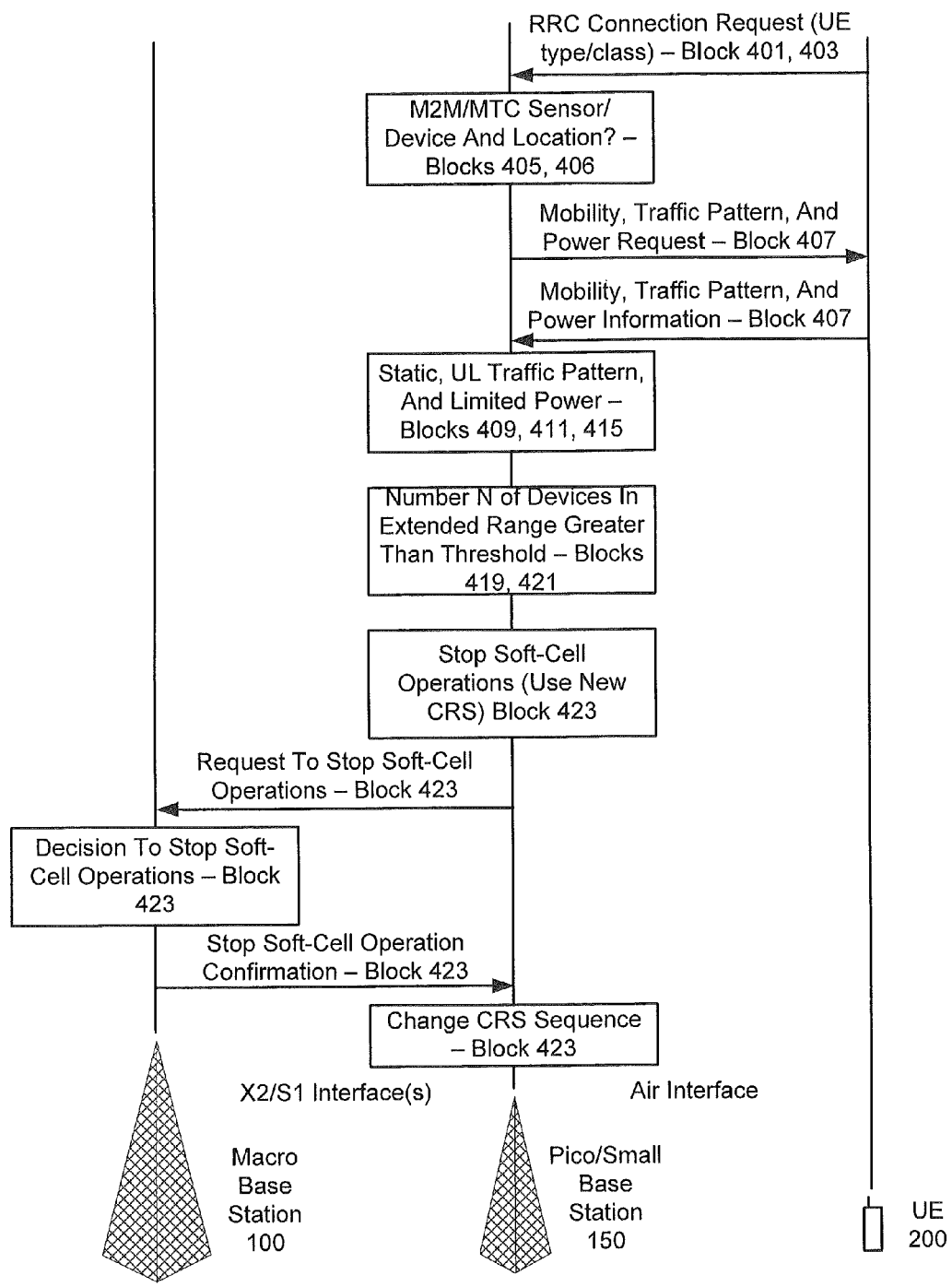

FIG. 6 is a diagram illustrating signaling according to some other embodiments illustrated in FIG. 4. Operations of blocks 401, 403, 405, 406, 407, 409, 411, 415, 417, 419, and 421 may be performed as discussed above with respect to FIG. 4, for example, with signaling between macro base station 100, pico/small base station 150, and UE 150 as shown in FIG. 6. At block 423 of FIGS. 4 and 6, pico/small base station processor 151 may transmit a request to macro base station 100 to stop/terminate soft-cell operations, but pico/small base station processor 151 may not actually stop soft-cell operations until instructed to do so by macro base station 100. Responsive to the counter value N exceeding Threshold_N at block 421 of FIG. 4, pico/small base station 150 may transmit a request to stop soft-cell operations as shown in FIG. 6, and responsive to the request to stop soft-cell operations, macro base station 100 processor 101 may decide to stop/terminate soft-cell operations for pico/small base station 150. Responsive to deciding to stop soft-cell operations, macro base station 100 may transmit a confirmation/instruction to stop soft-cell operations to pico/small base station 150. Responsive to receiving the confirmation/instruction, pico/small base station processor 151 may change its CRS sequence to use a new CRS sequence different than CRS sequence or sequences transmitted by macro base station 100. Accordingly, macro base station 100 may make the decision to stop soft-cell operations responsive to a request/recommendation from pico/small base station 150.

According to still other embodiments, operations of FIGS. 4, 5, and/or 6 may be performed, but soft-cell operations may be stopped by changing the CRS sequence used by the macro base station 100 while maintaining use of the same CRS sequence at the pico base station 150. Soft-cell operations may thus be provided by using the same CRS sequence at macro base station 100 and at pico/small base station 150, and soft cell operations may be stopped/terminated by using different CRS sequences at macro base station 100 and pico/small base station 150. Accordingly, soft-cell operations may be stopped/terminated at block 423 by: (1) changing a CRS sequence used by pico/small base station 150 while maintaining use of the CRS sequence or sequences used by macro base station 100; (2) changing a CRS sequence used by macro base station 100 while maintaining use of the CRS sequence used by pico/small base station 150; or (3) changing CRS sequences used by pico/small base station 150 and macro base station 100 to two different new CRS sequences.

Figure 7:
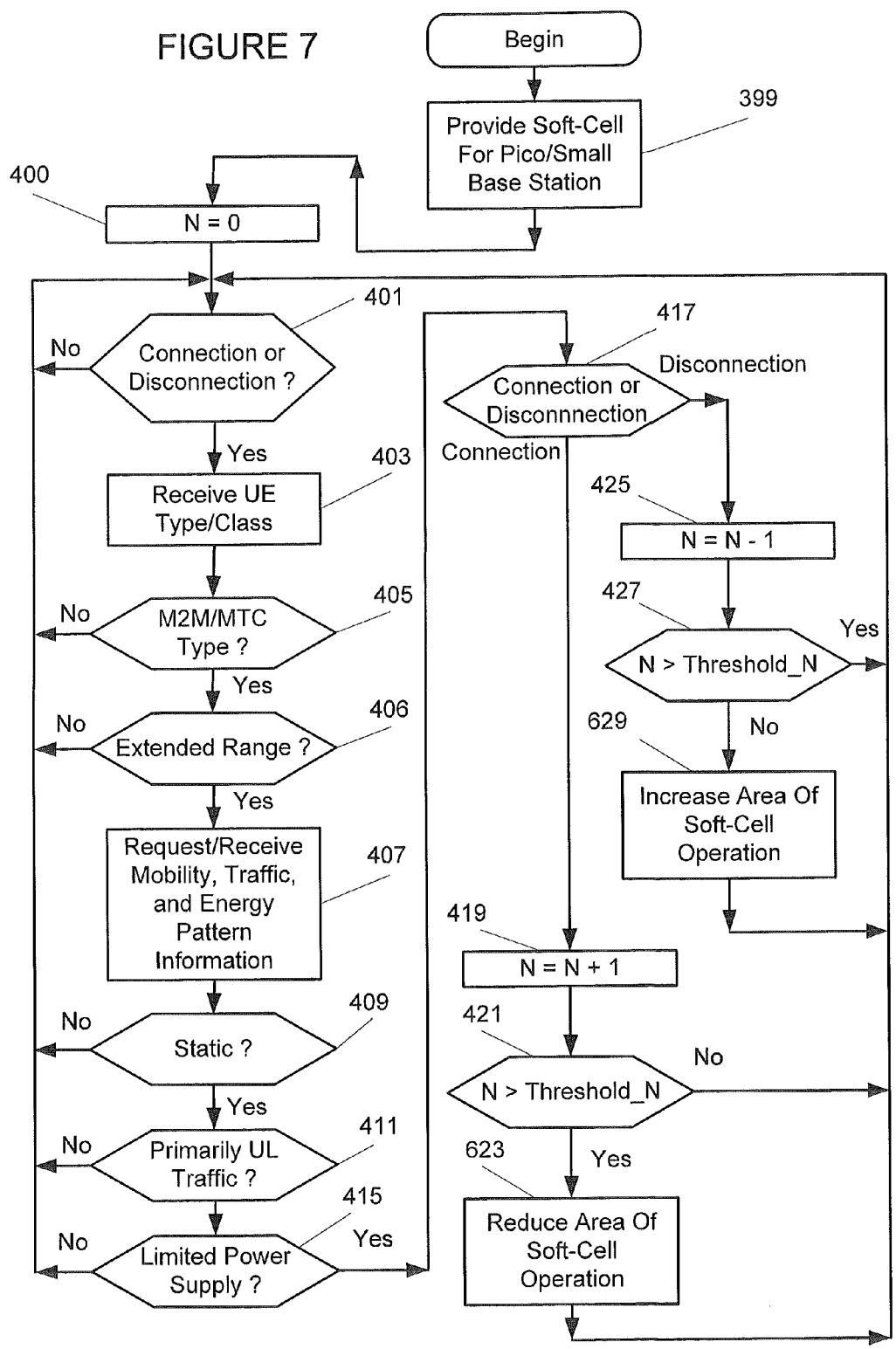
FIG. 7 is a flow chart illustrating operations of a pico/small base station processor according to some embodiments.

According to yet other embodiments illustrated in the flow chart of FIG. 7, a size of an area of soft-cell operation may be changed responsive to the counter value N exceeding Threshold_N. Responsive to detecting that a number of M2M/MTC devices/sensors in the extended cell range (i.e., in the soft-cell region) exceeds Threshold_N, pico/small base station 150 may reduce an area of its soft-cell operation by: (1) increasing a transmission power of its CRS sequences; and/or (2) requesting that cooperating macro base station 100 reduce a transmission power of its CRS sequences. Operations of blocks 399, 401, 403, 405, 406, 407, 409, 411, 415, 417, 419, 421, 425, and 427 in FIG. 7 may be the same as discussed above with respect to FIG. 4. In FIG. 7, however, pico/small base station processor may reduce an area of soft-cell operation at block 623 and/or increase an area of soft-cell operation at block 629 responsive to a number of M2M/MTC devices/sensors in a soft-cell region exceeding Threshold_N or not.

Responsive to N exceeding Threshold_N, decisions to increase/reduce an area of soft-cell operation at blocks 623 and/or 629 may be made at pico/small base station 100 and the decision may be transmitted to macro base station 100. According to other embodiments, pico/small base station 150 may transmit a request to reduce/increase in an area of soft-cell operation to macro base station 100 at blocks 623 and/or 629, and macro base station 100 may make the decision to reduce/increase the area of soft-cell operation. If macro base station 100 decides to reduce/increase the area of soft-cell operation, macro base station 100 may transmit the instruction to reduce/increase the area of soft-cell operation to pico/small base station 100, and pico/small base station 150 may change its CRS sequence responsive to the instruction.

Providing soft-cell communications in extended range area 150b/150c may include receiving uplink communications from wireless terminal 200 in the extended range area 150b/

150c at pico base station 150 while transmitting downlink communications to wireless terminal 200 in extended range area 150b/150c from macro base station 100. Reducing the extended range area may include receiving all uplink communications from wireless terminal 200 in the extended range area 150b/150c at pico base station 150 while transmitting all downlink communications to wireless terminal 200 in extended range area 150b/150c from pico base station 150.

Providing soft-cell communications in extended range area 150b/150c may include transmitting a same reference signal sequence (e.g., a same CRS sequence) from pico base station 150 and from macro base station 100. Reducing the extended range area may include increasing a transmission power of the reference signal sequence from the pico base station 150 and/or reducing a transmission power of the reference signal sequence from the macro base station 100.

According to some embodiments, reducing/increasing an area of soft-cell operation for pico/small base station 150 may thus include reducing/increasing an area of soft-cell operations while maintaining soft-cell operation over a reduced area even when the area is reduced. According to some other embodiments, reducing/increasing an area of soft-cell operation for pico/small base station 150 may include reducing the area of soft-cell operation by terminating soft-cell operation for pico/small base station. Stated in other words, terminating soft-cell operation for pico/small base station 150 may be interpreted as reducing an area of soft-cell operation to nothing.

According to some embodiments, monitoring connections/disconnections at blocks 401 and 417 may include monitoring RRC connections/disconnections. Accordingly, tracking a number of wireless devices in the extended range area connected with pico/small base station may at blocks 419.425 may include tracking a number of wireless devices in extended range area 150b/150c for which an RRC connection is provided with pico/small base station 150 whether active communication is occurring or not. Counter value N may thus be incremented at block 419 each time an RRC connection with a wireless terminal is provided, and counter value N may be decremented at block 425 each time each time an RRC connected wireless terminal has its RRC connection disconnected. By monitoring RRC connection/disconnection as opposed to active communications, an area of soft-cell operation may be increased/reduced relatively infrequently to provide greater system stability.

According to some other embodiments, monitoring connections/disconnections at blocks 401 and 417 may include monitoring connection/disconnection of active communications instead of monitoring connections/disconnections of RRC connections. Accordingly, tracking a number of wireless devices in the extended range area connected with pico/small base station 150 at blocks 419/425 may include tracking a number of wireless devices in extended range area 150b/150c actively communicating with the pico/small base station 150. Counter value N may thus be incremented at block 419 each time an active communication with a wireless terminal in extended range area 150b/150c is provided (as a connection of an active communication), and counter value N may be decremented at block 425 each time each time an active communications with a wireless terminal in extended range area 150b/150c is terminated (as a disconnection of an active communication). By monitoring connection/disconnection of active communications, an area of soft-cell operation may be increased/reduced relatively more frequently to more closely track pico/small base station loads.

According to some embodiments, energy consumption at wireless M2M/MTC sensors/devices may be reduced. Moreover, the value of Threshold_N may be set to 0 to provide protection even if a single M2M/MTC device/sensor is located in an extended cell range of pico/small base station 150. Moreover, other cell interference in the uplink generated with respect to the cooperating macro base station 100 may be reduced/minimized.

Abbreviations
3GPP: 3rd Generation Partnership Project
4G: 4th Generation mobile wireless standards
ABS or ABSF: Almost Blank Subframe
BCH: Broadcast CHannel
CA: Carrier Aggregation
CQI: Channel Quality Indicator
CRS: Cell-specific Reference Signal
CSG: Closed Subscriber Group
CSI: Channel State Information
DL: DownLink
DM-RS: Demodulation-specific Reference Signals
HO: Handover
ICIC: Inter-Cell Interference Coordination
LOS: Line Of Sight
LPN: Low Power Node
LTE: Long Term Evolution
M2M: Machine-To-Machine
MTC: Machine Type Communication
NLOS: Non Line Of Sight
PDCCH: Physical Downlink Control CHannel
PDSCH: Physical Downlink Shared CHannel
PHICH: Physical Hybrid-ARQ Indicator CHannel
PSS: Primary Synchronization Signal
PUCCH: Physical Uplink Control CHannel
PUSCH: Physical Uplink Shared CHannel
RACH: Random Access CHannel
RE: Range Expansion
RRC: Radio Resource Control
RRU: Remote Radio Unit
RSRP: Reference Symbols Received Power
RSRQ: Reference Symbols Received Quality
Rx: Radio receiver
SSS: Secondary Synchronization Signal
TTI: Transmission Time Interval
UE: User Equipment (or wireless terminal)
UL: UpLink
UL CoMP: UpLink Coordinated MultiPoint reception In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the following claims and their equivalents, and shall not be restricted or limited by the foregoing detailed description.

What is claimed is:

1. A method providing wireless communications in a network including a first base station and a second base station, with the first base station operating within a coverage area of the second base station, the method comprising:
    providing soft-cell communications in an extended range area of the first base station wherein the extended range area is outside a primary range area of the first base station;
    tracking a number of wireless devices in the extended range area connected and/or communicating with the first base station; and
    responsive to the number of wireless devices in the extended range area connected and/or communicating with the first base station exceeding a threshold, reducing the extended range area over which soft-cell communications are provided.

2. The method according to claim 1, wherein tracking the number of wireless devices comprises tracking a number of wireless devices that are static, that communicate primarily on an uplink, and that are power limited, wherein reducing the extended range area comprises reducing the extended range area over which soft-cell communications are provided responsive to the number of wireless devices that are static, that communicate primarily on an uplink, and that are power limited in the extended range area connected and/or communicating with the first base station exceeding the threshold.

3. The method according to claim 1, wherein tracking the number of wireless devices comprises for each wireless device that requests connection to the first base station, determining whether the wireless device is static, communicates primarily on an uplink, and is power limited, and responsive to determining that the wireless device is static, communicates primarily on the uplink, and is power limited, incrementing a counter value.

4. The method according to claim 3, wherein reducing the extended range area comprises reducing the extended range area responsive to the counter value exceeding the threshold.

5. The method according to claim 1 wherein reducing the extended range area comprises terminating soft cell communications for the first base station.

6. The method according to claim 5, wherein providing soft-cell communications in the extended range area comprises transmitting a same reference signal sequence from the first base station and from the second base station, and wherein terminating soft cell communications for the first base station comprises transmitting different reference signal sequences from the first base station and the second base station responsive to the number of wireless devices in the extended range area connected and/or communicating with the first base station exceeding a threshold.

7. The method according to claim 1 wherein providing soft-cell communications in the extended range area comprises receiving uplink communications from a wireless terminal in the extended range area at the first base station while transmitting downlink communications to the wireless terminal in the extended range area from the second base station, and wherein reducing the extended range area comprises receiving all uplink communications from the wireless terminal in the extended range area at the first base station while transmitting all downlink communications to the wireless terminal in the extended range area from the first base station responsive to the number of wireless devices in the extended range area connected and/or communicating with the first base station exceeding a threshold.

8. The method according to claim 1, wherein providing soft-cell communications in the extended range area comprises transmitting a same reference signal sequence from the first base station and from the second base station, and wherein reducing the extended range area comprises increasing a transmission power of the reference signal sequence from the first base station responsive to the number of wireless devices in the extended range area connected and/or communicating with the first base station exceeding a threshold and/or reducing a transmission power of the reference signal sequence from the second base station responsive to the number of wireless devices in the extended range area connected and/or communicating with the first base station exceeding a threshold.

9. The method according to claim 1 wherein reducing the extended range area comprises changing a reference signal sequence of the first base station responsive to the number of wireless devices in the extended range area connected and/or communicating with the first base station exceeding a threshold and/or increasing a transmission power of a reference signal sequence transmitted by the first base station responsive to the number of wireless devices in the extended range area connected and/or communicating with the first base station exceeding a threshold.

10. The method according to claim 1 wherein reducing the extended range area comprises transmitting a request from the first base station to the second base station to change a reference signal sequence of the second base station responsive to the number of wireless devices in the extended range area connected and/or communicating with the first base station exceeding a threshold and/or to reduce a transmission power of a reference signal sequence transmitted by the second base station responsive to the number of wireless devices in the extended range area connected and/or communicating with the first base station exceeding a threshold.

11. The method according to claim 1,
wherein tracking comprises tracking a number of wireless devices in the extended range area connected with the first base station, and
wherein reducing comprises reducing the extended range area over which soft-cell communications are provided responsive to the number of wireless devices in the extended range area connected with the first base station exceeding a threshold.

12. The method according to claim 1,
wherein tracking comprises tracking a number of wireless devices in the extended range area communicating with the first base station, and
wherein reducing comprises reducing the extended range area over which soft-cell communications are provided responsive to the number of wireless devices in the extended range area communicating with the first base station exceeding a threshold.

13. The method according to claim 1, wherein the first base station comprises a pico base station and the second base station comprises a macro base station.

14. The method according to claim 1 wherein tracking the number of wireless devices comprises tracking a number of wireless devices that report an M2M (Machine To Machine) or/and MTC (Machine Type Communication) machine type/class, and wherein reducing the extended range area comprises reducing the extended range area over which soft-cell communications are provided responsive to the number of wireless devices that report an M2M (Machine To Machine) or/and MTC (Machine Type Communication) machine type/class in the extended range area connected and/or communicating with the first base station exceeding the threshold.

15. The method according to claim 1, wherein tracking the number of wireless devices comprises for each wireless device that requests connection to the first base station, determining whether the wireless device reports an M2M (Machine To Machine) or/and MTC (Machine Type Communication) machine type/class, and responsive to determining that the wireless device reports an M2M (Machine To Machine) or/and MTC (Machine Type Communication) machine type/class, incrementing a counter value, wherein reducing the extended range area comprises reducing the extended range area responsive to the counter value exceeding the threshold.

16. The method according to claim 1 wherein providing soft-cell communications comprises receiving uplink data channels and/or control channels from a wireless device at the first base station while at least one downlink data channel and/or control channel for the wireless device is transmitted from the second base station.

17. A first base station capable of providing communications within a coverage area of a second base station, the first base station comprising:
a transceiver configured to provide communications with wireless terminals over a wireless interface; and
a processor coupled to the transceiver, wherein the processor is configured to provide soft-cell communications through the transceiver in an extended range area of the first base station wherein the extended range area is outside a primary range area of the first base station, to track a number of wireless devices in the extended range area connected and/or communicating with the first base station, and to reduce the extended range area over which soft-cell communications are provided responsive to the number of wireless devices in the extended range area connected and/or communicating with the first base station exceeding a threshold.

18. The first base station according to claim 17, wherein the processor is configured to track the number of wireless devices by tracking a number of wireless devices that are static, that communicate primarily on an uplink, and that are power limited, and wherein the processor is configured to reduce the extended range area by reducing the extended range area over which soft-cell communications are provided responsive to the number of wireless devices that are static, that communicate primarily on an uplink, and that are power limited in the extended range area connected and/or communicating with the first base station exceeding the threshold.

19. The first base station according to claim 17, wherein the processor is configured to track the number of wireless devices by determining for each wireless device that requests connection to the first base station, whether the wireless device is static, communicates primarily on an uplink, and is power limited, and by incrementing a counter value responsive to determining that the wireless device is static, communicates primarily on the uplink, and is power limited.

20. The first base station according to claim 19, wherein the processor is configured to reduce the extended range area by reducing the extended range area responsive to the counter value exceeding the threshold.

21. The first base station according to claim 17 wherein the processor is configured to reduce the extended range area by terminating soft cell communications for the first base station.

22. The first base station according to claim 21, wherein the processor is configured to provide soft-cell communications in the extended range area by transmitting a same reference signal sequence from the first base station and from the second base station, and wherein the processor is configured to terminate soft cell communications for the first base station by transmitting different reference signal sequences from the first base station and the second base station responsive to the number of wireless devices in the extended range area connected and/or communicating with the first base station exceeding a threshold.

23. The first base station according to claim 17 wherein the processor is configure to provide soft-cell communications in the extended range area by receiving uplink communications from a wireless terminal in the extended range area at the first base station while transmitting downlink communications to the wireless terminal in the extended range area from the second base station, and wherein the processor is configured to reduce the extended range area by receiving all uplink communications from the wireless terminal in the extended range area at the first base station while transmitting all downlink communications to the wireless terminal in the extended range area from the first base station responsive to the number of wireless devices in the extended range area connected and/or communicating with the first base station exceeding a threshold.

24. The first base station according to claim 17, wherein the processor is configured to provide soft-cell communications in the extended range area by transmitting a same reference signal sequence from the first base station and from the second base station, and wherein the processor is configured to reduce the extended range area by increasing a transmission power of the reference signal sequence from the first base station responsive to the number of wireless devices in the extended range area connected and/or communicating with the first base station exceeding a threshold and/or by reducing a transmission power of the reference signal sequence from the second base station responsive to the number of wireless devices in the extended range area connected and/or communicating with the first base station exceeding a threshold.

25. The first base station according to claim 17 wherein the processor is configured to reduce the extended range area by changing a reference signal sequence of the first base station responsive to the number of wireless devices in the extended range area connected and/or communicating with the first base station exceeding a threshold and/or by increasing a transmission power of a reference signal sequence transmitted by the first base station responsive to the number of wireless devices in the extended range area connected and/or communicating with the first base station exceeding a threshold.

26. The first base station according to claim 17 wherein the processor is configured to reduce the extended range area by transmitting a request from the first base station to the second base station to change a reference signal sequence of the second base station responsive to the number of wireless devices in the extended range area connected and/or communicating with the first base station exceeding a threshold and/or to reduce a transmission power of a reference signal sequence transmitted by the second base station responsive to the number of wireless devices in the extended range area connected and/or communicating with the first base station exceeding a threshold.

27. The first base station according to claim 17,
wherein the processor is configured to track by tracking the number of wireless devices in the extended range area connected with the first base station, and
wherein the processor is configured to reduce by reducing the extended range area over which soft-cell communications are provided responsive to the number of wireless devices in the extended range area connected with the first base station exceeding a threshold.

28. The first base station according to claim 17,
wherein the processor is configured to track by tracking a number of wireless devices in the extended range area communicating with the first base station, and
wherein the processor is configured to reduce by reducing the extended range area over which soft-cell communications are provided responsive to the number of wireless devices in the extended range area communicating with the first base station exceeding a threshold.

29. The first base station according to claim 17, wherein the first base station comprises a pico base station configured to provide communications within a coverage area of a macro base station.

30. The first base station according to claim 17 wherein the processor is configured to track the number of wireless devices by tracking a number of wireless devices that report an M2M (Machine To Machine) or/and MTC (Machine Type Communication) machine type/class, and wherein the processor is configured to reduce the extended range area by reducing the extended range area over which soft-cell communications are provided responsive to the number of wireless devices that report an M2M (Machine To Machine) or/and MTC (Machine Type Communication) machine type/class in the extended range area connected and/or communicating with the first base station exceeding the threshold.

31. The base station according to claim 17, wherein the processor is configured to track the number of wireless devices by determining for each wireless device that requests connection to the first base station whether the wireless device reports an M2M (Machine To Machine) or/and MTC (Machine Type Communication) machine type/class, and wherein the processor is configured to increment a counter value responsive to determining that the wireless device reports an M2M (Machine To Machine) or/and MTC (Machine Type Communication) machine type/class, and wherein the processor is configured to reduce the extended range area by reducing the extended range area responsive to the counter value exceeding the threshold.

32. The first base station according to claim 17 wherein the processor is configured to provide soft-cell communications by receiving uplink data channels and/or control channels from a wireless device through the transceiver while at least one downlink data channel and/or control channel for the wireless device is transmitted from the second base station.

\* \* \* \* \*